United States Patent [19]

Ueda et al.

[11] Patent Number: 4,823,219
[45] Date of Patent: Apr. 18, 1989

[54] CARRIAGE RECORDING HEAD SANDWICHED BY ELECTROMAGNETIC COIL SECTIONS

[75] Inventors: Takaharu Ueda; Takashi Yumura; Tetsu Yamamoto; Kiyosi Funai, all of Amagasaki, Japan

[73] Assignee: Mitsubishi Denki Kabushiki Kaisha, Japan

[21] Appl. No.: 54,778

[22] Filed: May 27, 1987

[30] Foreign Application Priority Data

May 27, 1986 [JP] Japan .................. 61-120076

[51] Int. Cl.⁴ .................. G11B 5/55; G11B 21/08
[52] U.S. Cl. .................. 360/106; 369/220
[58] Field of Search .................. 369/219–221, 369/45, 112, 43–44; 360/106, 104–105; 310/12, 13

[56] References Cited

U.S. PATENT DOCUMENTS

| | | | |
|---|---|---|---|
| 4,396,966 | 8/1983 | Scranton et al. | 360/106 |
| 4,443,721 | 4/1984 | Jansen | 310/14 |
| 4,506,307 | 3/1985 | Watsous | 360/106 |
| 4,538,882 | 9/1985 | Tanaka et al. | 369/45 |
| 4,547,871 | 10/1985 | Sugiyama et al. | 369/45 X |
| 4,594,520 | 6/1986 | Mima et al. | 310/12 |
| 4,620,253 | 10/1986 | Garwin et al. | 360/106 |
| 4,740,946 | 4/1988 | Yumura et al. | 310/13 X |

FOREIGN PATENT DOCUMENTS

| | | | |
|---|---|---|---|
| 0084080 | 4/1980 | Japan | 360/106 |
| 0018035 | 1/1982 | Japan | 369/44 |
| 0167147 | 10/1982 | Japan | 369/44 |
| 0147770 | 7/1986 | Japan | 310/12 |

*Primary Examiner*—Stuart N. Hecker
*Assistant Examiner*—David J. Severin
*Attorney, Agent, or Firm*—Leydig, Voit & Mayer

[57] ABSTRACT

A carriage assembly for a disc operating apparatus comprising a frame, a carriage movably supported in the frame relative to the disc, an optical lens or magnetic head mounted on the carriage for recording and reproducing information on the disc, and a radial guide arrangement permitting movement of the carriage in a radial direction relative to the disc. The assembly also comprises a radial drive arrangement including an electromagnetic coil mounted to the carriage and a permanent magnet mounted to the frame. The permanent magnet is electromagnetically coupled with the electromagnetic coil for driving the carriage in the radial direction of the disc. The electromagnetic coil includes two sections which sandwich the carriage and are shaped to come into contact with each other at both sides thereof, whereby the cross section of the electromagnetic coil is hexagonal in a plane parallel to a surface of the disc. As a result, the dimensions in the radial direction of the carriage assembly are decreased.

7 Claims, 3 Drawing Sheets

CARRIAGE RECORDING HEAD SANDWICHED BY ELECTROMAGNETIC COIL SECTIONS

BACKGROUND OF THE INVENTION

This invention relates to a carriage assembly capable of positioning a recording head at any desired position with respect to the surface of a disc.

FIG. 1 illustrates, in perspective, an example of a conventional carriage assembly for use in an optical disc apparatus.

Such a conventional carriage assembly comprises a frame 1, an objective lens 2 for projecting a light beam toward an optical disc 3 which rotates about a shaft 3a. A carriage 4 is movably supported within the frame 1 and comprises a translating member 4a of substantially rectangular cross-section having a data converter unit (not shown) incorporated therein, and a pickup assembly 4b mounted on one end portion of the translating member 4a. The pickup assembly 4b also carries thereon the objective lens 2. Further included in the assembly is a radial guide arrangement 7 for permitting the carriage 4 to move in a radial direction relative to the disc 3. the radial guide arrangement 7 comprises linear bearings 8 mounted on both sides of the translating member 4a of the carriage 4 and a pair of guide rails 9 secured to the frame 1 in a parallel relationship with respect to each other and in the radial direction relative to the disc 3. the carriage assembly further comprises a radial drive arangement 10 including an electromagnetic coil 11, which has coil windings 11a and is secured to the translating member 4a of the carriage 4, and a pair of magnetic circuits 12. Each of the magnetic circuits 12 comprises an outer stator yoke 13 of a magnetic material having a substantially U-shaped horizontal cross section, a permanent magnet 14 disposed in an inner side of the bight portion of the U-shpaed yoke 13 and a center pole piece 15 connected to the ends of the leg portions of the U-shaped yoke 13, through which a magnetic flux flows. The center pole piece 15 is electromagnetically coupled with the electromagnetic coil 11. The optical lens 2, the carriage 4, the linear bearings 8 and the electromagnetic coil 11 together constitute a moving unit. the guide rails 9 and the magnetic circuits 12 together constitute a stationary unit.

When the electromagnetic coil 11 is energized in accordance with a command from an external control unit (not shown), a magnetic field is generated around the coil windings 11a and the thus generated magnetic field generates a driving force in cooperation with the magnetic flux flowing through the respective center pole pieces 15 as defined by Fleming's rule, whereby the carriage 4 together with the objective lens 2 are moved in the direction indicated by an arrow A or A' shown in FIG. 1, i.e. in the radial direction relative to the disc 3. the objective lens 2 mounted on the pickup assembly 4b is arranged so as to be movable in the radial direction and/or in the vertical direction relative to the disc 3 to constantly form a read spot of the light beam on the disc surface. For this purpose, the pickup assembly 4b includes an adjusting device (not shown) mounted therein for adjusting the focus of the objective lens 2 at any desired position on the disc surface by moving it in the radial direction to the disc 3 as well as in the perpendicular direction to the disc surface.

When a recording or reproducing function is to be performed, first the objective lens 2 is approximately positioned over a desired area on the disc 3 by regulating the current supplied to the electromagnetic coil 11. Once the lens 2 is positioned over the desired area of the disc, the current supplied to the electromagnetic coil 11 is cut off, whereby the driving force ceases. Then, the objective lens 2 is moved in the radial direction and/or perpendicular direction to the disc 3 by means of the adjusting device disposed in the pickup assembly 4b, so that the light beam generated by the data converter unit (not shown) located in the carriage 4 and projected through the lens 2 is precisely positioned on a desired position on the disc surface.

The thus-constructed conventional carriage assembly has problems in that, since the electromagnetic coil 11 is disposed on one side of the pickup assembly 4b and with a certain distance from the pickup assembly 4b as shown in FIG. 1, the physical dimension in the travelling direction of the moving unit is large, whereby it becomes difficult for the carriage assembly to be made compact. Further, since the side portions of the electromagnetic coil 11 may be deformed in the travelling direction as indicated by an arrow A or A' in FIG. 1 due to the driving force, it is difficult to stop the carriage 4 at a desired position with precision, and therefore it may not be possible to precisely position the light beam projected through the objective lens 2 at a desired position on the disc surface. In order to increase the precision of movement of the moving unit, the rigidity of the electromagnetic coil 11 must be increased in the travelling direction of the electromagnetic coil 11. For this purpose, it is necessary to increase the thickness of the electromagnetic coil 11, such that the electromagnetic coil 11 is not deformed in the travelling direction thereof.

SUMMARY OF THE INVENTION

Accordingly, an object of the invention is to provide a carriage assembly free from the above discussed problems.

Another object of the invention is to provide a carriage assembly whose physical dimension is minimized in the travelling direction thereof.

Still another object of the invention is to provide a carriage assembly in which the rigidity of the electromagnetic coil is increased in the travelling directions thereof, i.e. in the radial direction relative to the disc.

According to this invention, a carriage assembly for a disc operating apparatus comprises a frame, a recording head means such as an optical lens for recordal and reproduction and a carriage movably supported in the frame for movement radially relative to the disc. The assembly further comprises radial guide means which supports the carriage to move in a radial direction relative to the disc and radial drive means including an electromagnetic coil mounted to the carriage and a permanent magnet mounted to the frame and electromagnetically coupled with the electromagnetic coil, for driving the carriage in the radial direction. The electromagnetic coil comprises two sections mounted to opposite ends of said carriage and separated in the radial direction of the disc by the carriage.

More specifically, the carriage assembly has an electromagnetic coil comprising two sections mounted the opposite ends of the carriage, and thus separated in the radial direction of the disc, and shaped to come into contact with each other at both lateral sides of the coil sections, thereby allowing the physical dimension of the moving unit in the travelling direction thereof to be minimized.

BRIEF DESCRIPTION OF THE DRAWINGS

This invention will become more readily apparent from the following detailed description of the preferred embodiment of this invention taken in conjunction with the accompanying drawings, in which.

DETAILED DESCRIPTION OF THE PREFERRED EMBODIMENT

Figure 1:
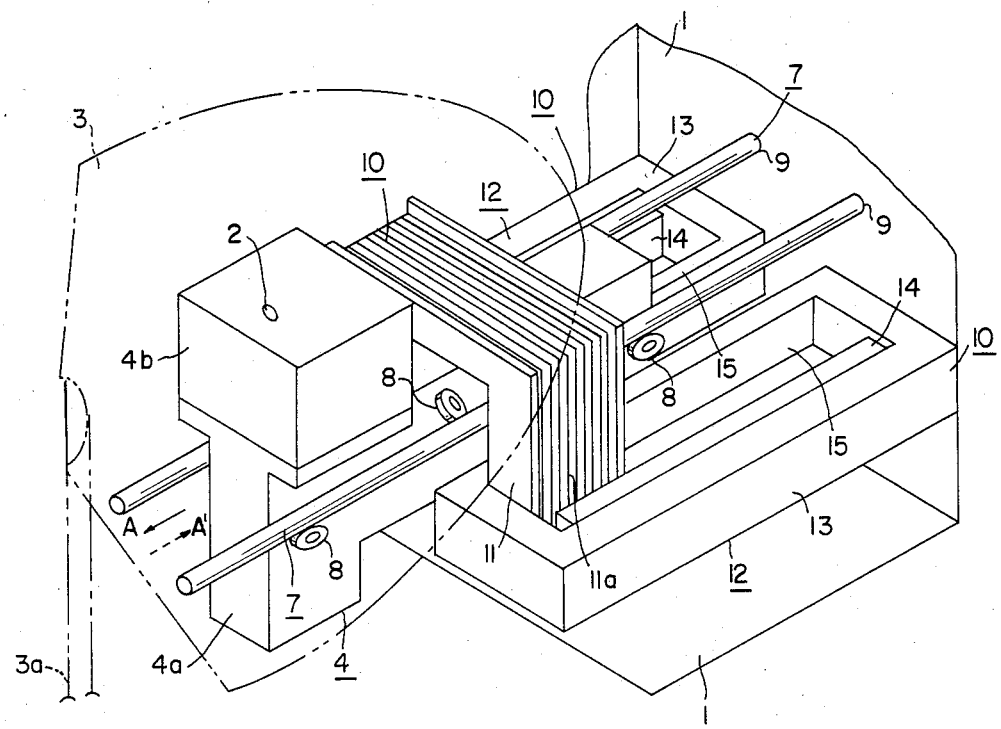
FIG. 1 is a perspective view of a conventional carriage assembly.
Figure 2:
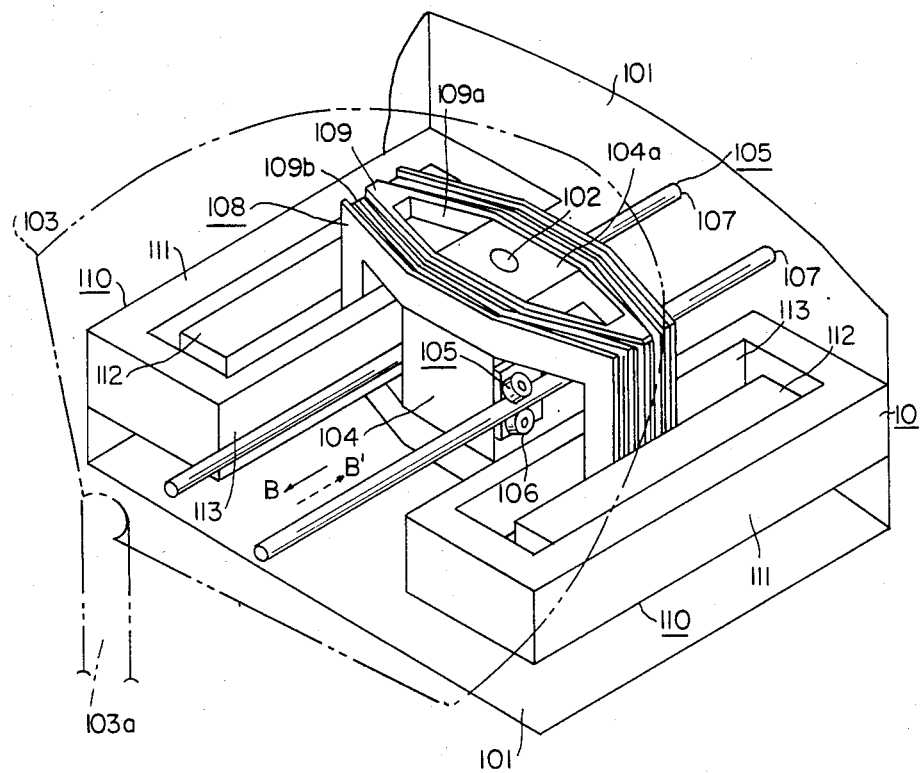
FIG. 2 is a perspective view of a carriage assembly according to an embodiment of this invention.
Figure 3:
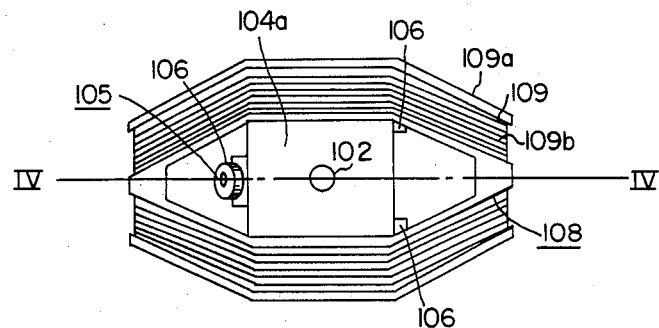
FIG. 3 is an enlarged view of a part of FIG. 2.
Figure 4:
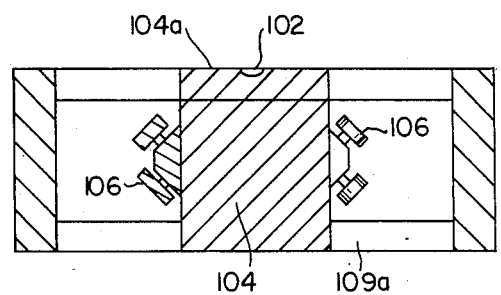
FIG. 4 is a side view of the same part taken along line IV—IV in FIG. 3.

In FIGS. 2 to 4, in which one embodiment of this invention is illustrated, the carriage assembly according to this invention comprises a frame 101, a carriage 104 movably supported in the frame 101, and a recording head 102 supported by the carriage 104. The recording head 102 is an objective lens for projecting and receiving a light beam at any desired position on a surface of an optical disc 103 which rotates about a shaft 103a for optical recordal and reproduction. The carriage 104, having a data converter unit (not shown) and a pickup assembly 104a incorporated therein, is movably supported in the frame 101 for translating the objective lens 102 through which the light beam is projected and received. The carriage assembly further comprises radial guide means such as a radial guide arrangement 105 for permitting a movement of the carriage in the radial direction relative to the disc. The radial guide arrangement 105 comprises linear bearings 106 mounted on both sides of the carriage 104 and a pair of guide rails 107 secured to the frame 101 with a predetermined distance therebetween and extending in the radial direction to the disc 103. The linear bearings 106 engage the guide rails 107, so that the carriage 104 can travel along the guide rails 107. The carriage assembly further comprises radial drive means such as a radial drive arrangement 108 including an electromagnetic coil 109 secured to the carriage 104 and a pair of magnetic circuits 110 mounted to the frame 101 and electromagnetically coupled with the electromagnetic coil 109, for driving the carriage 104 in the radial direction of the disc 103. Each of the magnetic circuits 110 comprises an outer stator yoke 111 of a magnetic material having a substantially U-shaped horizontal cross section, a permanent magnet 112 secured to an inner wall of the right portion of the U-shaped outer stator yoke 111, and a center pole piece 113, which is disposed in a parallel relationship with respect to the guide rail 107 and connected to the ends of both legs of the U-shaped outer stator yoke 111 through which a magnetic flux flows. The objective lens 102, the carriage 104, the linear bearings 106 and the electromagnetic coil 109 together constitute a moving unit. The frame 101, the guide rails 107, and the mangetic circuit 110 comprising the U-shaped outer stator yoke 111, the permanent magnet 112 and the center pole piece 113 together constitute a stationary unit of the carriage assembly.

As can be seen from FIGS. 2 to 4, the electromagnetic coil 109 comprises a coil bobbin 109a and coil windings 109b wound around the coil bobbin 109a. The coil bobbin 109a is shaped like a substantially rectangular picture frame and has two symmetrical portions mounted at two opposite ends of the carriage 104 separated in the radial direction of the disc 103. Both sides of each of the symmetrically separated portions of the coil bobbin 109a around which the windings are wound are shaped so as to come into contact with each other, i.e. the coil bobbin 109a has a hexagonal cross section when cut in a plane parallel to the disc surface, whereby the rigidity of the electromagnetic coil 109 is increased in the travelling directions thereof, i.e. in the radial direction of the disc 103.

In the illustrated embodiment, the carriage 104 has corner edges thereof cut off which form recesses and upper and lower reduced portions of the carriage 104 are sandwiched by the separated sections of the coil bobbin 109a, thereby allowing the carriage assembly to be further compacted.

In the thus constructed carriage assembly, when the electromagnetic coil 109 is energized, a magnetic field is generated around the windings 109b thereof, and the generated magnetic field around the windings 109b generates a driving force in cooperation with the magnetic flux flowing through the center pole pieces 113 to move the carriage 104 together with the objective lens 102 in the direction indicated by an arrow B or B' shown in FIG. 2, i.e. in the radial direction of the disc 103. When the objective lens 102 arrives at a desired area over the disc surface, the supply of the current to the electromagnetic coil 109 is cut off. Then, the objective lens 102 is moved in the radial direction and/or in the perpendicular direction of the disc surface, so that an exact position and focus of the lens 102 may be established. A light beam carrying data provided from the data converter unit is projected at a desired position over the disc surface through the focused lens 102, whereby the recordal and reproduction of data on the disc surface can be carried out.

In the illustrated embodiment, the coil bobbin 109a and the coil windings 109b wound around the coil bobbin 109a constitute the electromagnetic coil 109 which is mounted on the carriage 104. According to another embodiment, the coil windings 109b may be wound directly around the carriage 104 without the coil bobbin 109a. According to still another embodiment, coil windings are interconnected to form a structural unit by a connecting means such as an impregnating material and the structural unit of coil windings is secured to the upper and lower recesses of the carriage 104.

It should be noted that, although the carriage has the data converter unit incorporated therein, it need not necessarily be so, and the data converter unit may be incorporated in any of a number of other ways, so that the physical dimension and the weight of the carriage assembly are further decreased. Still further, the carriage assembly according to this invention may be also applied to any other magnetic information recording system such as a magnetic disc apparatus.

As can be seen from FIGS. 2 to 4, the carriage 104 is sandwiched by two separated sections of the electromagnetic coil 109, thereby decreasing the physical dimension of the carriage assembly in the direction in which the moving unit moves. Both sides of the coil bobbin are shaped so as to come into contact with each other, thereby allowing the cross sectional area in the plane parallel to the disc surface to be increased, so that the rigidity of the electromagnetic coil is increased.

What is claimed is:

1. A carriage assembly for disc operating apparatus, said carriage assembly comprising:
   a frame;
   a carriage movably supported by said frame;
   recording head means carried by said carriage for recording and reproducing information on the disc;
   radial guide means for supporting said carriage for movement in a radial direction relative to the disc to position said recording head means to a desired radial location relative to the disc; and
   radial drive means, including an electromagnetic coil mounted to said carriage and a permanent magnet mounted to said frame and electromagnetically coupled with said electromagnetic coil, for driving said carriage in the radial direction;
   said electromagnetic coil including two sections which are mounted to opposite ends of said carriage in the radial direction of the disc and which are symmetrical, said coil sections being separated at central portions, said carriage being sandwiched between said coil section central portions and said coil sections being closer together at both lateral sides thereof than at said central portions, said coil sections being wound between said lateral sides around said radial guide means.

2. A carriage assembly as claimed in claim 1 wherein said carriage includes bobbin sections on which each of said sections of said electromagnetic coil are wound, said bobbin sections having a shape of a substantially rectangular picture frame.

3. A carriage assembly as claimed in claim 1 wherein said two sections of said electromagnetic coil are shaped so as to come into contact with each other at both sides thereof, whereby the cross section of said electromagnetic coil is hexagonal in a plane parallel to the surface of the disc.

4. A carriage assembly as claimed in claim 1 wherein said carriage has notches at each corner thereof for receiving therein said separated sections of said electromagnetic coil.

5. A carriage assembly as claimed in claim 1 wherein said electromagnetic coil includes coil windings directly wound around bobbin portions of said carriage.

6. A carriage assembly as claimed in claim 1 wherein said recording head means includes an objective lens mounted on said carriage and between said coil sections, said lens providing for projecting and receiving a light beam on a surface of an optical disc.

7. A carriage assembly as claimed in claim 1 wherein said recording head means includes a mangetic head mounted on said carriage and between said coil sections, said magnetic head providing for recording on a magnetic disc.

* * * * *